United States Patent
Otaka et al.

(10) Patent No.: US 12,287,410 B2
(45) Date of Patent: Apr. 29, 2025

(54) VEHICLE AND VEHICLE SYSTEM

(71) Applicant: HONDA MOTOR CO., LTD., Tokyo (JP)

(72) Inventors: Masaru Otaka, Wako (JP); Ryusuke Tamanaha, Wako (JP); Takahiro Iijima, Tokyo (JP); Yusuke Oi, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1197 days.

(21) Appl. No.: 16/952,134

(22) Filed: Nov. 19, 2020

(65) Prior Publication Data
US 2021/0181353 A1    Jun. 17, 2021

(30) Foreign Application Priority Data
Dec. 17, 2019   (JP) .................. 2019-227574

(51) Int. Cl.
*G01S 19/01* (2010.01)
*H04W 16/18* (2009.01)
*H04W 76/10* (2018.01)
*H04W 84/00* (2009.01)

(52) U.S. Cl.
CPC ............. *G01S 19/01* (2013.01); *H04W 16/18* (2013.01); *H04W 76/10* (2018.02); *H04W 84/005* (2013.01)

(58) Field of Classification Search
CPC ...... G01S 19/01; H04B 7/0617; H04W 16/18; H04W 16/28; H04W 76/10; H04W 84/005
See application file for complete search history.

(56) References Cited

U.S. PATENT DOCUMENTS

| | | | |
|---|---|---|---|
| 9,100,780 B2 * | 8/2015 | Emadzadeh | H04W 4/02 |
| 2007/0057845 A1 | 3/2007 | Miura | |
| 2014/0003365 A1 | 1/2014 | Carey et al. | |
| 2014/0004897 A1 * | 1/2014 | Jung | H04B 7/0413 |
| | | | 455/509 |

(Continued)

FOREIGN PATENT DOCUMENTS

| | | |
|---|---|---|
| CN | 1883135 | 12/2006 |
| CN | 105722204 | 6/2016 |

(Continued)

OTHER PUBLICATIONS

Japanese Office Action for Japanese Patent Application No. 2019-227574 mailed Mar. 22, 2022.

(Continued)

*Primary Examiner* — Timothy A Brainard
(74) *Attorney, Agent, or Firm* — Amin, Turocy & Watson, LLP (57) ABSTRACT

A vehicle is a movable vehicle and includes an access point function unit having an antenna and configured to function as an access point by wirelessly communicating with a terminal device located near the antenna and a control unit configured to control a directivity direction of radio waves transmitted through the antenna so that a radio wave intensity of radio waves transmitted to a predetermined first region set on the basis of a surrounding environment of the antenna is less than a radio wave intensity of radio waves transmitted to a second region other than the first region.

12 Claims, 8 Drawing Sheets

(56) References Cited

U.S. PATENT DOCUMENTS

| | | | |
|---|---|---|---|
| 2015/0244459 A1 | 8/2015 | Lindsay | |
| 2018/0213414 A1* | 7/2018 | Be | H04B 1/3822 |
| 2020/0037301 A1* | 1/2020 | Park | G05D 1/0088 |
| 2020/0065443 A1* | 2/2020 | Liu | G06Q 10/04 |
| 2021/0056770 A1* | 2/2021 | Moradi Pari | G07C 5/0841 |

FOREIGN PATENT DOCUMENTS

| | | |
|---|---|---|
| JP | 2015-056835 | 3/2015 |
| JP | 2017-188709 | 10/2017 |
| JP | 2018-067880 | 4/2018 |
| JP | 2019-009530 | 1/2019 |
| JP | 2019-521536 | 7/2019 |
| JP | 2019-146072 | 8/2019 |
| WO | 2014/115418 | 7/2014 |
| WO | 2017/180561 | 10/2017 |

OTHER PUBLICATIONS

Chinese Office Action for Chinese Patent Application No. 202011366642.5 mailed May 18, 2023.

* cited by examiner

VEHICLE AND VEHICLE SYSTEM

CROSS-REFERENCE TO RELATED APPLICATION

Priority is claimed on Japanese Patent Application No. 2019-227574, filed Dec. 17, 2019, the content of which is incorporated herein by reference.

BACKGROUND OF THE INVENTION

Field of the Invention

The present invention relates to a vehicle and a vehicle system.

Description of Related Art

For example, under an environment in which a portable terminal device is used, an access point that mediates the transmission of radio waves between the terminal device and a base station may be provided. In recent years, technology for using a vehicle as an access point has been studied. There is technology for delivering an advertisement to a terminal connected to an access point when a vehicle is used as the access point (see, for example, Japanese Unexamined Patent Application, First Publication No. 2019-521536 (hereinafter, Patent Document 1)).

SUMMARY OF THE INVENTION

In the technology disclosed in Patent Document 1, a direction of radio waves transmitted by the vehicle may deviate from a location where there is a user.

An aspect according to the present invention has been made in consideration of such circumstances and an objective of the present invention is to provide a vehicle and a vehicle system capable of transmitting radio waves in a direction in which there is a user.

In order to solve the above problems and achieve the above objective, the present invention adopts the following aspects.

(1): There is provided a vehicle which is movable, the vehicle including: an access point function unit having an antenna and configured to function as an access point by wirelessly communicating with a terminal device located near the antenna; and a control unit configured to control a directivity direction of radio waves transmitted through the antenna so that a radio wave intensity of radio waves transmitted to a first region set on the basis of a surrounding environment of the antenna is less than a radio wave intensity of radio waves transmitted to a second region other than the first region.

(2): In the above-described aspect (1), the vehicle may further include: a first acquisition unit configured to acquire surrounding information about the surrounding environment of the antenna; and a first setting unit configured to set the first region on the basis of the surrounding information acquired by the first acquisition unit.

(3): In the above-described aspect (1) or (2), the vehicle may further include: a second acquisition unit configured to acquire map information of a region where the vehicle moves; and a second setting unit configured to set the first region on the basis of the map information acquired by the second acquisition unit.

(4): In any one of the above-described aspects (1) to (3), the antenna may include a plurality of antenna elements and the control unit may control the directivity direction of the radio waves through beamforming using two or more antenna elements among the plurality of antenna elements.

(5): In any one of the above-described aspects (1) to (4), the first region may include at least one of a roadway region set in a roadway and an entrance region set near an entrance of a building.

(6): In any one of the above-described aspects (1) to (5), the vehicle may further include: a counting unit configured to measure the number of terminal devices that have established a wireless connection with the access point function unit; and a connection inhibition unit configured to inhibit a new wireless connection with the access point function unit and the terminal device from being established when the number of terminal devices measured by the counting unit exceeds a predetermined upper limit value.

(7): In the above-described aspect (6), the vehicle may further include a definition unit configured to define the upper limit value on the basis of characteristics of the second region.

(8): According to an aspect of the present invention, there is provided a vehicle system including: a vehicle configured to be movable; and a management unit configured to manage the vehicle, wherein the management unit includes a storage unit configured to store a restricted range where wireless transmission by the vehicle is restricted as compared with another range, and wherein the vehicle includes: a detection unit configured to detect a position of the vehicle; an access point function unit having an antenna and configured to function as an access point by wirelessly communicating with a terminal device located near the antenna; a setting unit configured to set a first region for restricting a region where radio waves are transmitted through the antenna on the basis of the position of the vehicle detected by the detection unit and the restricted range stored in the storage unit; and a control unit configured to control a directivity direction of radio waves transmitted through the antenna so that a radio wave intensity of radio waves transmitted to the first region set by the setting unit is less than a radio wave intensity of radio waves transmitted to a second region other than the first region.

(9): In the above-described aspect (8), the antenna may include a plurality of antenna elements and the control unit may perform beamforming using two or more antenna elements among the plurality of antenna elements and control the directivity direction of the radio waves.

(10): In the above-described aspect (8) or (9), the first region may include at least a part of a roadway region set in a roadway and an entrance region set near an entrance of a building.

(11): In any one of the above-described aspects (8) to (10), the management unit may further include a rewriting unit configured to rewrite the restricted range stored in the storage unit.

(12): In any one of the above-described aspects (8) to (11), the vehicle system may further include: a counting unit configured to measure the number of terminal devices that have established a wireless connection with the access point function unit; and a connection inhibition unit configured to inhibit a new wireless connection with the access point function unit and the terminal device from being established when the number of terminal devices measured by the counting unit exceeds a predetermined upper limit value.

(13): In the above-described aspect (12), the vehicle system may further include a definition unit configured to define the upper limit value on the basis of characteristics of the second region.

According to the above aspects (1) to (13), the vehicle and the vehicle system can transmit radio waves in a direction in which a user is present.

According to the above aspects (2) and (3), a region where the user is unlikely to be present can be set as the first region.

According to the above aspects (4) and (9), the directivity of radio waves transmitted from an antenna 80 can be adjusted with high accuracy.

According to the above aspects (5) and (10), it is possible to restrict the transmission of radio waves in a direction suitable for the absence of a user.

According to the above aspects (6) and (12), it is possible to restrict the gathering of a large number of users in a region where a wireless connection with an access point function unit 30 is possible.

According to the above aspects (7) and (13), it is possible to restrict the gathering of too many users with respect to a user capacity and the like.

DETAILED DESCRIPTION OF THE INVENTION

Hereinafter, a vehicle according to an embodiment will be described.

Overall Configuration

Figure 1:
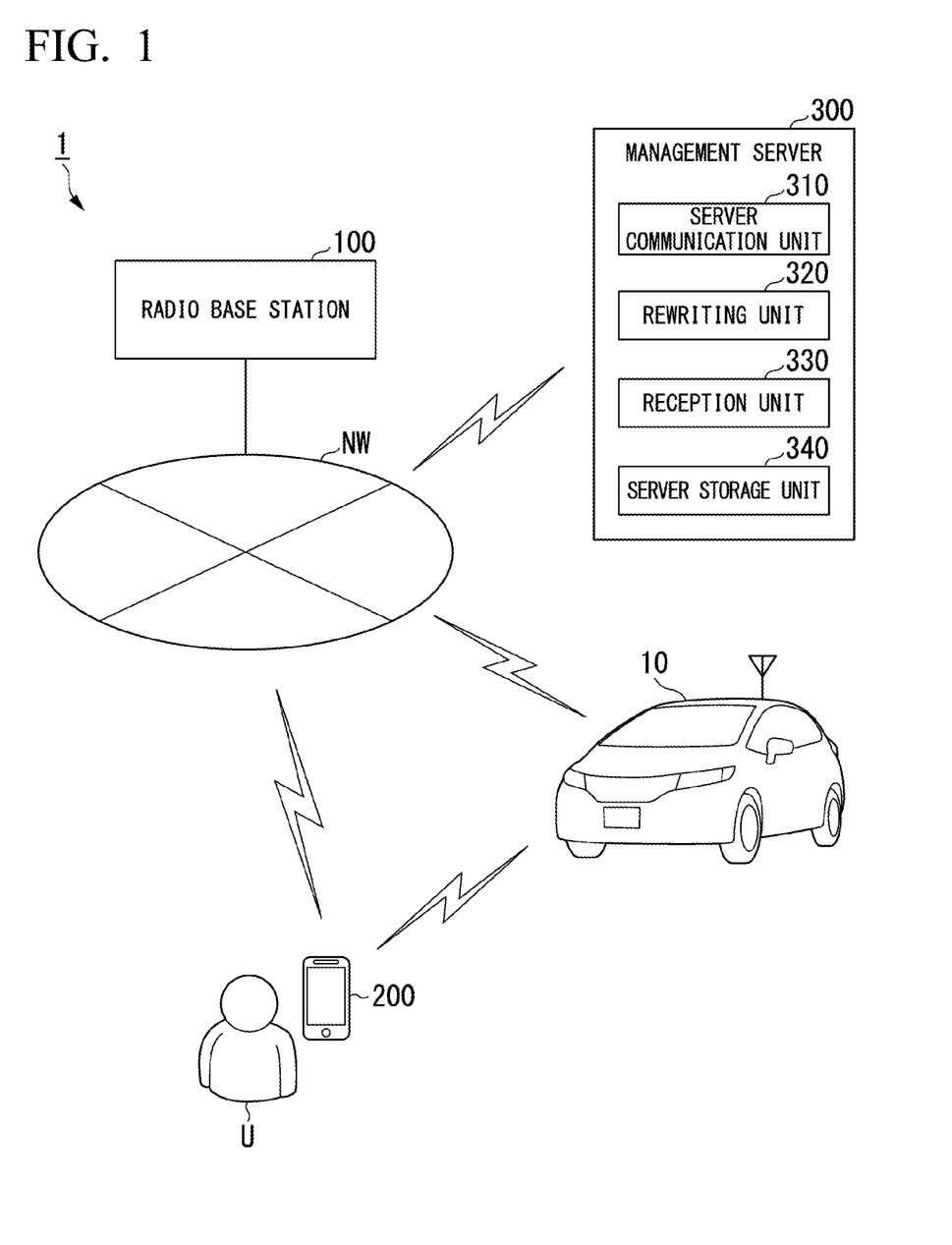
FIG. 1 is a diagram showing an example of a configuration of a vehicle system according to an embodiment.

FIG. 1 is a diagram showing an example of a configuration according to a vehicle system 1 according to the embodiment. The vehicle system 1 includes a vehicle 10 and a management server 300. The vehicle 10 is, for example, an electric vehicle. The vehicle 10 may be a vehicle equipped with a secondary battery that supplies electric power for traveling and may be a hybrid vehicle or a fuel cell vehicle. The vehicle 10 is movable. As shown in FIG. 1, the vehicle 10 can communicate with a radio base station 100 and a management server 300 via a network NW. The network NW is, for example, a cellular network. The vehicle 10 mediates communication between, for example, the radio base station 100 and the portable terminal 200. The management server 300 is an example of a "management unit."

The portable terminal 200 owned by a user U is a terminal device capable of wirelessly communicating with the vehicle 10 through a wireless LAN such as Wi-Fi (registered trademark). The portable terminal 200 can wirelessly communicate with the radio base station 100 by causing mediation to be performed using the vehicle 10 as an access point. The portable terminal 200 can also wirelessly communicate with the radio base station 100 via the network NW without performing mediation for the vehicle 10. The terminal device may be a terminal device other than the portable terminal.

As shown in FIG. 1, the management server 300 includes a server communication unit 310, a rewriting unit 320, a reception unit 330, and a server storage unit 340. The server communication unit 310 includes a radio module for connecting a wireless communication network such as a cellular network. The rewriting unit 320 and the reception unit 330 are implemented by, for example, a hardware processor such as a central processing unit (CPU) executing a program (software). Some or all of these components may be implemented by hardware (a circuit unit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device such as a hard disk drive (HDD) or a flash memory (a storage device having a non-transitory storage medium) or may be stored in a removable storage medium (the non-transitory storage medium) such as a DVD or a CD-ROM and installed when the storage medium is mounted in a drive device. The server storage unit 340 is implemented by a storage device on the above-described server side. The server storage unit 340 stores map information of a region where the vehicle 10 travels, for example, a map of the whole of Japan. The server storage unit 340 stores a restricted range in which the wireless transmission by the vehicle 10 is restricted as compared with another range (hereinafter referred to as "non-restricted range") and the non-restricted range together with the map information.

The rewriting unit 320 rewrites the restricted range stored in the server storage unit 340 when a predetermined rewriting condition has been satisfied. The rewriting condition may be any condition. The rewriting condition may be, for example, changes in new surrounding environments such as weather, a date and time, a day of the week, a time period, ambient illuminance, a temperature, the presence or absence of an event, seasons, and shops. The rewriting unit 320 stores a restricted region and a non-restricted region that are newly set in the server storage unit 340.

Figure 2:
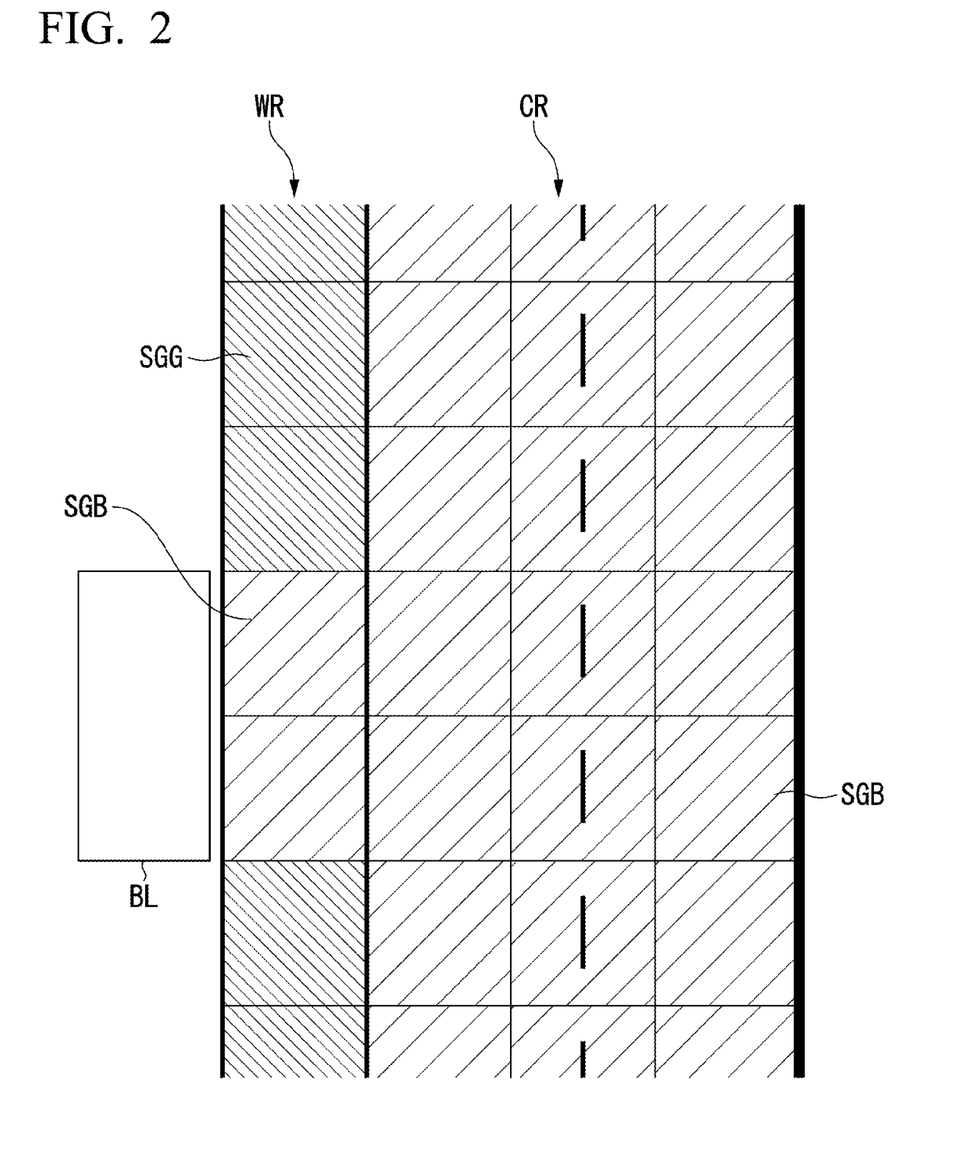
FIG. 2 is a diagram showing an example of a restricted range and a non-restricted range set on a map.

For example, the restricted range and the non-restricted range stored by the server storage unit 340 are set in a format in which the region shown in the map information is segmented and restriction and non-restriction are set for each segment. FIG. 2 is a diagram showing an example of a restricted range and a non-restricted range set on the map. For example, as shown in FIG. 2, the region on the map is divided into vertical and horizontal segments SG and each segment SG is set as a restricted segment or a non-restricted segment.

For example, a possibility that a vehicle traveling on the roadway will travel on a sidewalk WR is low and a possibility that the user U of the portable terminal 200 will be in contact with a vehicle even if the user U is located on the sidewalk WR is not high. On the other hand, a possibility that a traveling vehicle will travel on a roadway CR with two lanes on each side is high and a possibility that the user U of the portable terminal 200 will be in contact with a traveling vehicle is relatively high if the user U is located on the roadway CR.

Therefore, for example, a segment SG located on the sidewalk WR is set as a non-restricted segment SGG and its range is set as a non-restricted range, and a segment SG located on the roadway CR is set as a restricted segment SGB in the restricted range. By setting the non-restricted range on the sidewalk WR and setting the restricted range on the roadway CR, the entry of the user U of the portable terminal 200 into the restricted range such as the roadway CR for performing wireless communication with the vehicle 10 is restricted. A region occupied by the restricted segment SGB set on the roadway CR is an example of a roadway region set on the roadway.

For example, it is inconvenient to enter and exit a building BL due to the gathering of people near the entrance of the building BL on the sidewalk WR. Therefore, for example, the segment SG located on the sidewalk WR other than the vicinity of the entrance of the building BL is set as the non-restricted segment SGG and its range is set as the restricted range. By setting the vicinity of the entrance of the building BL as the restricted range, it is possible to restrict a situation where people gather at the entrance of the building BL. A region occupied by the restricted segment SGB set near the entrance of the building BL on the sidewalk WR is an example of an "entrance region."

The reception unit 330 receives a map information request through the vehicle 10. When the reception unit 330 has received the map information request, map information of surroundings of a vehicle that has transmitted the request (hereinafter referred to as a "requesting vehicle") is transmitted to the requesting vehicle. The reception unit 330 includes information about the restricted range and the non-restricted range when the map information is transmitted.

Figure 3:
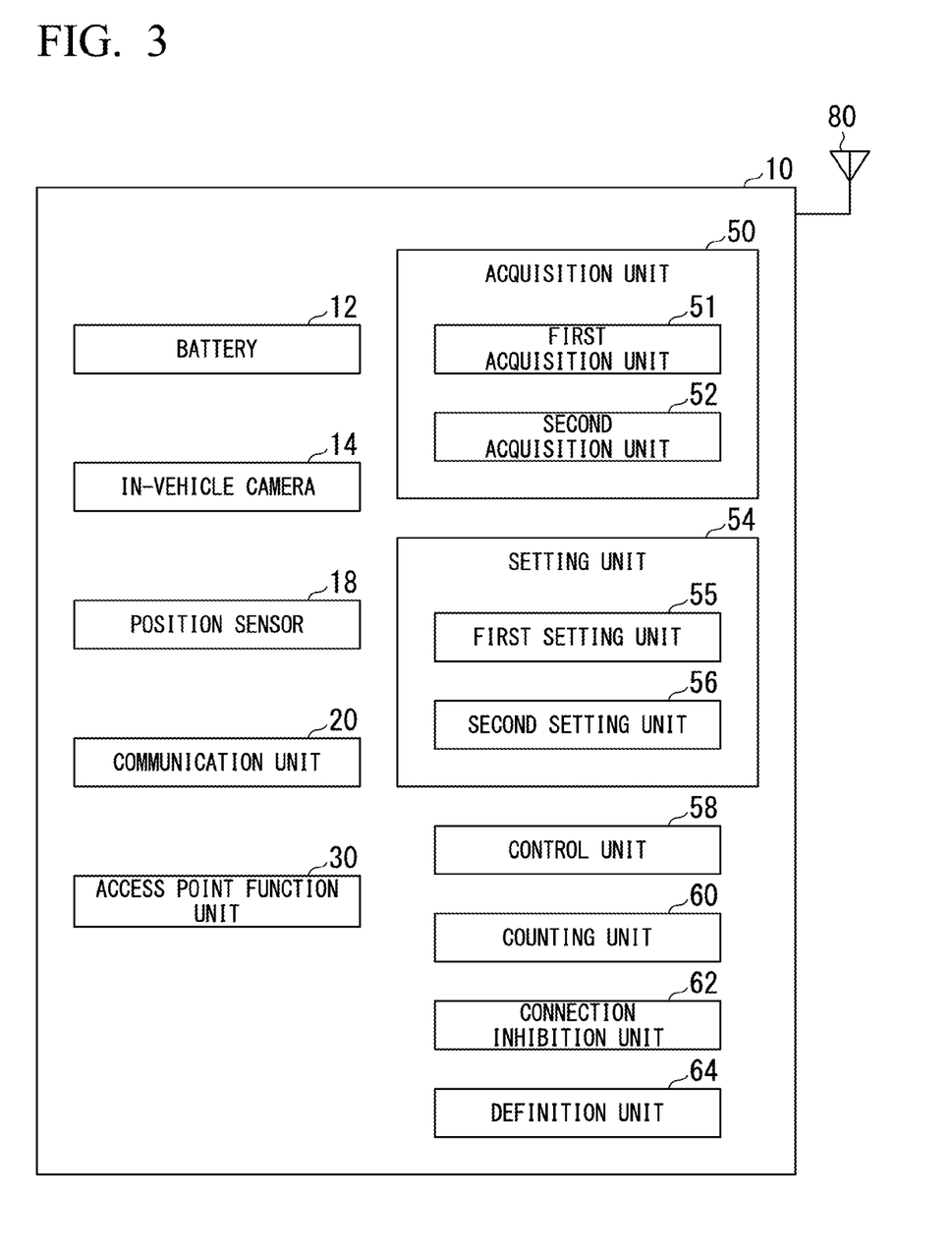
FIG. 3 is a diagram showing an example of a configuration of a vehicle.

FIG. 3 is a diagram showing an example of a configuration of the vehicle 10. As shown in FIG. 3, for example, the vehicle 10 includes a battery 12, an in-vehicle camera 14, a position sensor 18, a communication unit 20, an access point function unit 30, an acquisition unit 50, a setting unit 54, a control unit 58, a counting unit 60, a connection inhibition unit 62, and a definition unit 64.

For example, the battery 12 is a secondary battery such as a lithium ion battery. The battery 12 stores electric power introduced from an external charger of the vehicle 10 and is discharged for traveling of the vehicle 10. The in-vehicle camera 14 photographs surroundings of the vehicle outside the vehicle 10. The in-vehicle camera 14 generates image information obtained by imaging the photographed surrounding environment of the vehicle. The position sensor 18 includes, for example, a global navigation satellite system (GNSS). The position sensor 18 is a detection unit that detects the position of the vehicle 10.

The communication unit 20 includes a radio module for connecting to wireless communication networks such as a wireless LAN and a cellular network. The access point function unit 30 has an antenna 80. For example, the antenna 80 is provided outside the vehicle 10. The antenna 80 transmits radio waves having directivity.

Figure 4:
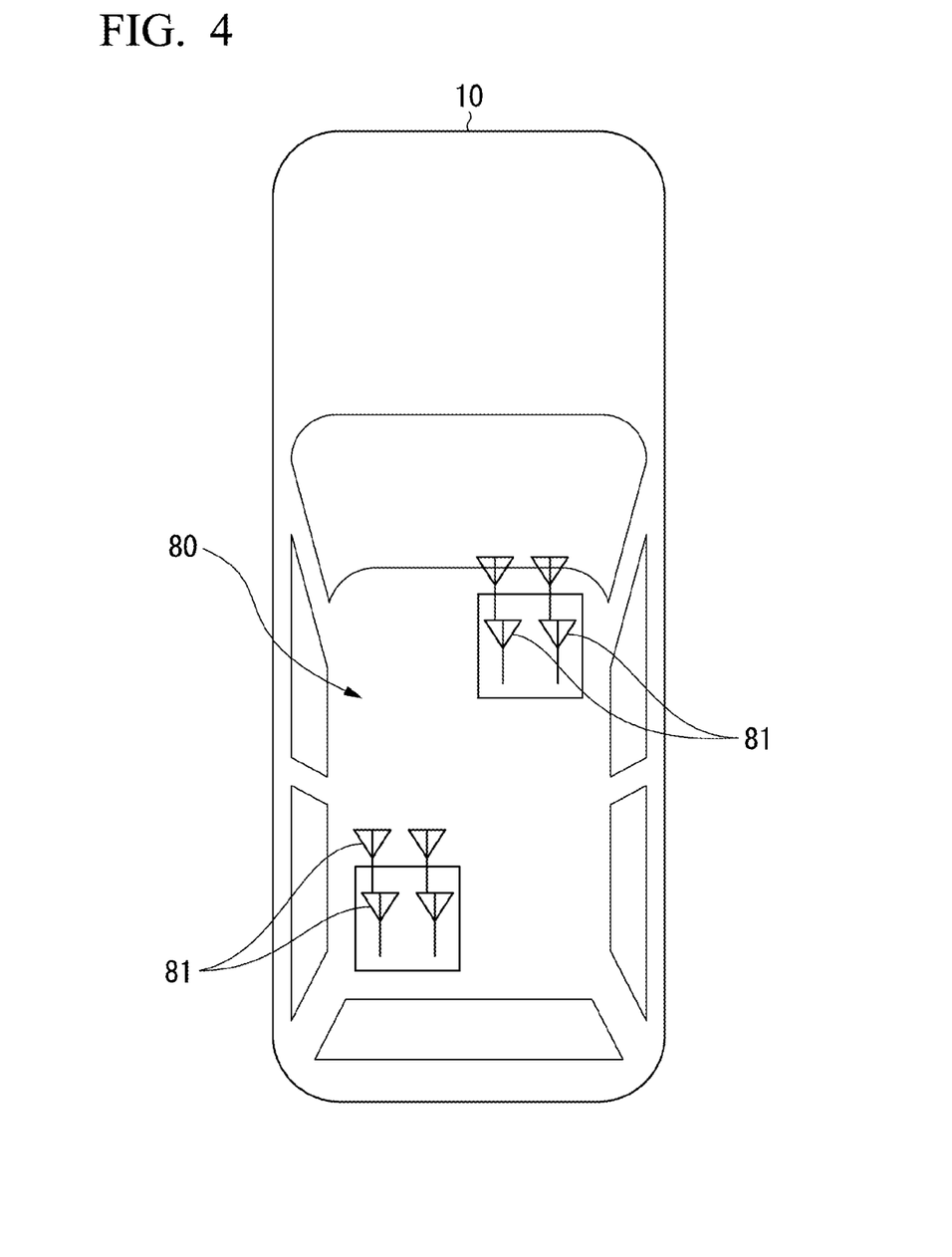
FIG. 4 is a diagram showing an example of an antenna provided in a vehicle.

FIG. 4 is a diagram showing an example of the antenna 80 provided on the vehicle 10. As shown in FIG. 4, the antenna 80 includes, for example, one or more array antenna units including a plurality of (two or more) antenna elements 81. In the embodiment, two array antenna units are provided at two locations such as a front right location and a rear left location on the vehicle 10.

For example, the access point function unit 30 receives a connection request from an external device such as a portable terminal 200 near the antenna 80. The access point function unit 30 receives a connection request from the portable terminal 200 and mediates communication with the portable terminal 200 and the radio base station 100 via the network NW when the user has been authenticated. The access point function unit 30 functions as an access point by wirelessly communicating with the portable terminal 200 present near the vehicle 10. The access point function unit 30 functions as an access point and therefore the vehicle 10 functions as an access point.

The acquisition unit 50, the setting unit 54, the control unit 58, the counting unit 60, the connection inhibition unit 62, and the definition unit 64 are implemented by, for example, a hardware processor such as a CPU executing a program (software). Some or all of these components may be implemented by hardware (a circuit unit including circuitry) such as an LSI circuit, an ASIC, an FPGA, or a GPU or may be implemented by software and hardware in cooperation. The program may be stored in advance in the server storage unit 340 of the management server 300 such as an HDD or a flash memory or may be stored in a removable storage medium such as a DVD or a CD-ROM and installed when the storage medium is mounted in a drive device.

The acquisition unit 50 includes a first acquisition unit 51 and a second acquisition unit 52. The first acquisition unit 51 acquires surrounding information about the surrounding environment of the antenna 80 on the basis of the image information output by the in-vehicle camera 14. The second acquisition unit 52 requests the management server 300 to provide map information of the surroundings of the vehicle 10 detected by the position sensor 18. The second acquisition unit 52 acquires the map information transmitted from the management server 300 in response to the request of the second acquisition unit 52. The map information includes information about the restricted and non-restricted ranges. The second acquisition unit 52 acquires the restricted region and the non-restricted region included in the map information.

The setting unit 54 includes a first setting unit 55 and a second setting unit 56. The first setting unit 55 sets a radio wave reduction region near the vehicle 10 on the basis of the surrounding information acquired by the first acquisition unit 51. The radio wave reduction region is a region where a radio wave intensity is less than the radio wave intensity of radio waves transmitted to a region other than the radio wave reduction region (hereinafter referred to as a "normal region"). The second setting unit 56 sets a radio wave reduction region near the vehicle 10 on the basis of the restricted range and the non-restricted range included in the map information of the vehicle 10 acquired by the second acquisition unit 52. The restricted range and the non-restricted range included in the map information are, for example, basic information when the radio wave reduction region is set. Each radio wave reduction region is an example of a "first region" and the normal region is an example of a "second region."

The control unit 58 adjusts a directivity direction of the antenna 80 (a directivity direction of radio waves) by adjusting an intensity of a signal supplied to each of the plurality of antenna elements 81 in the antenna 80 shown in FIG. 4, determining an operation and a non-operation of the antenna element 81, and performing beamforming using two or more antenna elements 81. When the antenna 80 has structural directivity, the control unit 58 may adjust the directivity of the radio waves transmitted by the antenna 80 by controlling a mechanical mechanism provided in the antenna 80. The control unit 58 controls the directivity direction of the radio waves transmitted by the antenna 80 so that the radio wave intensity of the radio waves transmitted to the radio wave reduction region set by the first setting unit 55 or the second setting unit 56 is less than the radio wave intensity of the radio waves transmitted to the normal region.

Although the directivity direction of the antenna 80 can be adjusted by beamforming in the embodiment, the directivity direction of the radio waves transmitted by the antenna 80 may be adjusted in a method other than beamforming. For example, the antenna 80 is a parabolic antenna and the directivity direction of the antenna 80 may be adjusted by adjusting the directivity direction of the antenna 80. Alternatively, a shield that blocks the passage of radio waves may be provided in a part of the antenna 80, so that a direction in which the shield has been avoided becomes the directivity direction of the radio waves.

The counting unit 60 measures the number of portable terminals 200 that have established a wireless connection with the access point function unit 30. The connection inhibition unit 62 inhibits a new wireless connection between the access point function unit 30 and the portable terminal 200 when the number of portable terminals 200 that have established a wireless connection with the access point function unit 30 exceeds a predetermined upper limit value.

The definition unit 64 defines an upper limit value for use in the connection inhibition unit 62 on the basis of characteristics of the normal region. For example, when the directivity direction of the antenna 80 is directed to a place such as a plaza where many users who have portable terminals 200 can easily gather, the definition unit 64 increases the upper limit value of the number of portable terminals 200 that establish a wireless connection. When the directivity direction of the antenna 80 is directed to a place such as a road which is not suitable for the user who owns the portable terminal 200 to stay, the definition unit 64 decreases the upper limit value of the number of portable terminals 200 that establish a wireless connection.

Figure 5:
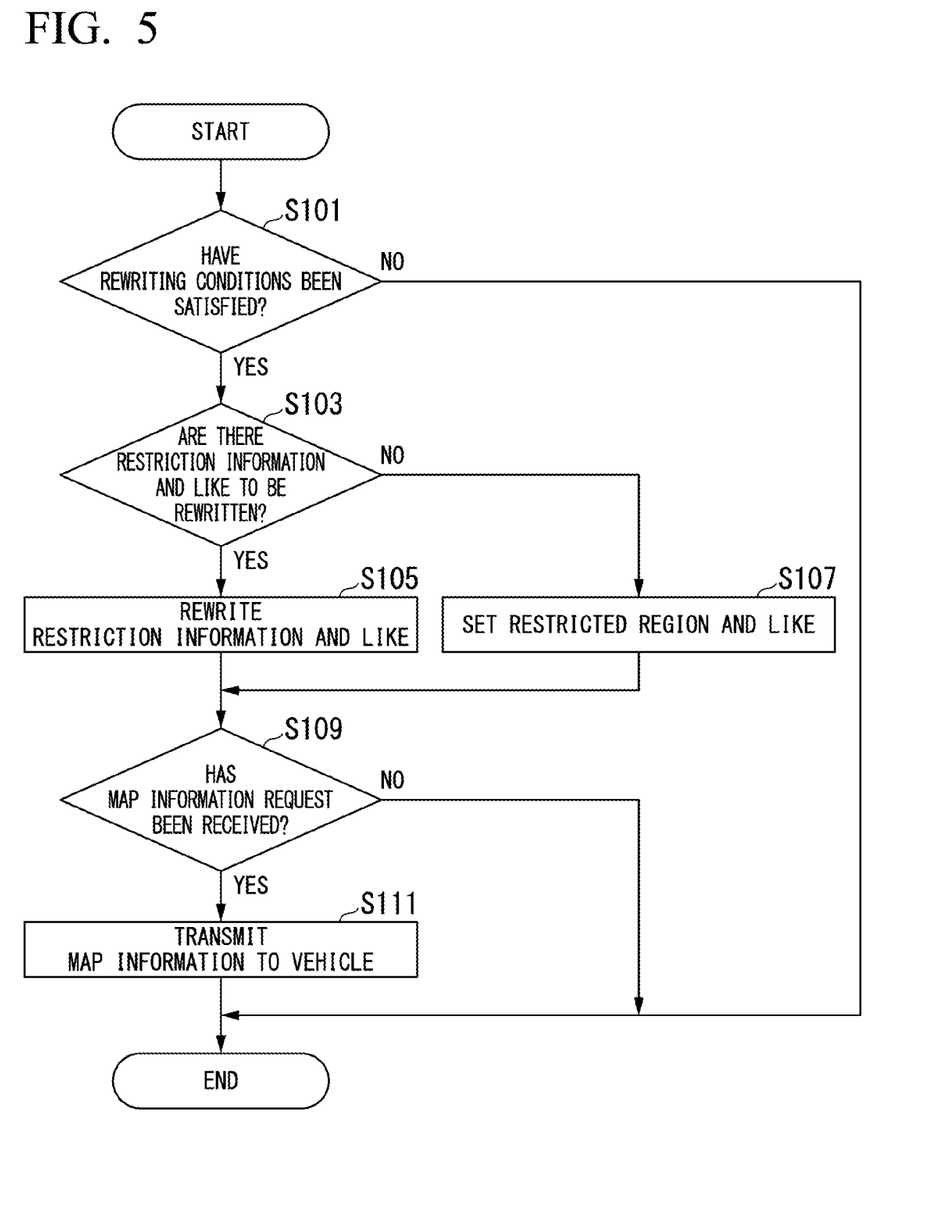
FIG. 5 is a flowchart showing an example of a process executed by a management server.

Next, a process of the vehicle system of the embodiment will be described. First, a process of the management server 300 will be described. FIG. 5 is a flowchart showing an example of the process executed by the management server 300. The management server 300 determines whether or not rewriting conditions of the restricted region and the non-restricted region included in the map information have been satisfied in the rewriting unit 320 (step S101). When the rewriting unit 320 determines that the rewriting conditions of the restricted region and the non-restricted region included in the map information have not been satisfied, the management server 300 ends the process shown in FIG. 5.

When the rewriting conditions have been satisfied, the rewriting unit 320 determines whether or not there are restriction information and non-restriction information (hereinafter referred to as "restriction information and the like") to be rewritten (step S103). When there are restriction information and the like to be rewritten, the rewriting unit 320 rewrites the restriction information and the like to be rewritten (step S105). When there are no restriction information and the like to be rewritten, the rewriting unit 320 newly sets the restriction information and the like to be rewritten (step S107).

Subsequently, the reception unit 330 determines whether or not a map information request transmitted by the vehicle 10 has been received (step S109). When the reception unit 330 has received the map information, the reception unit 330 transmits map information of the surroundings of the requesting vehicle that has requested the map information to the requesting vehicle together with the restriction information and the non-restriction information (step S111). Subsequently, the management server 300 ends the process shown in FIG. 5. When the reception unit 330 has not received the map information, the management server 300 ends the process shown in FIG. 5 as it is.

Figure 6:
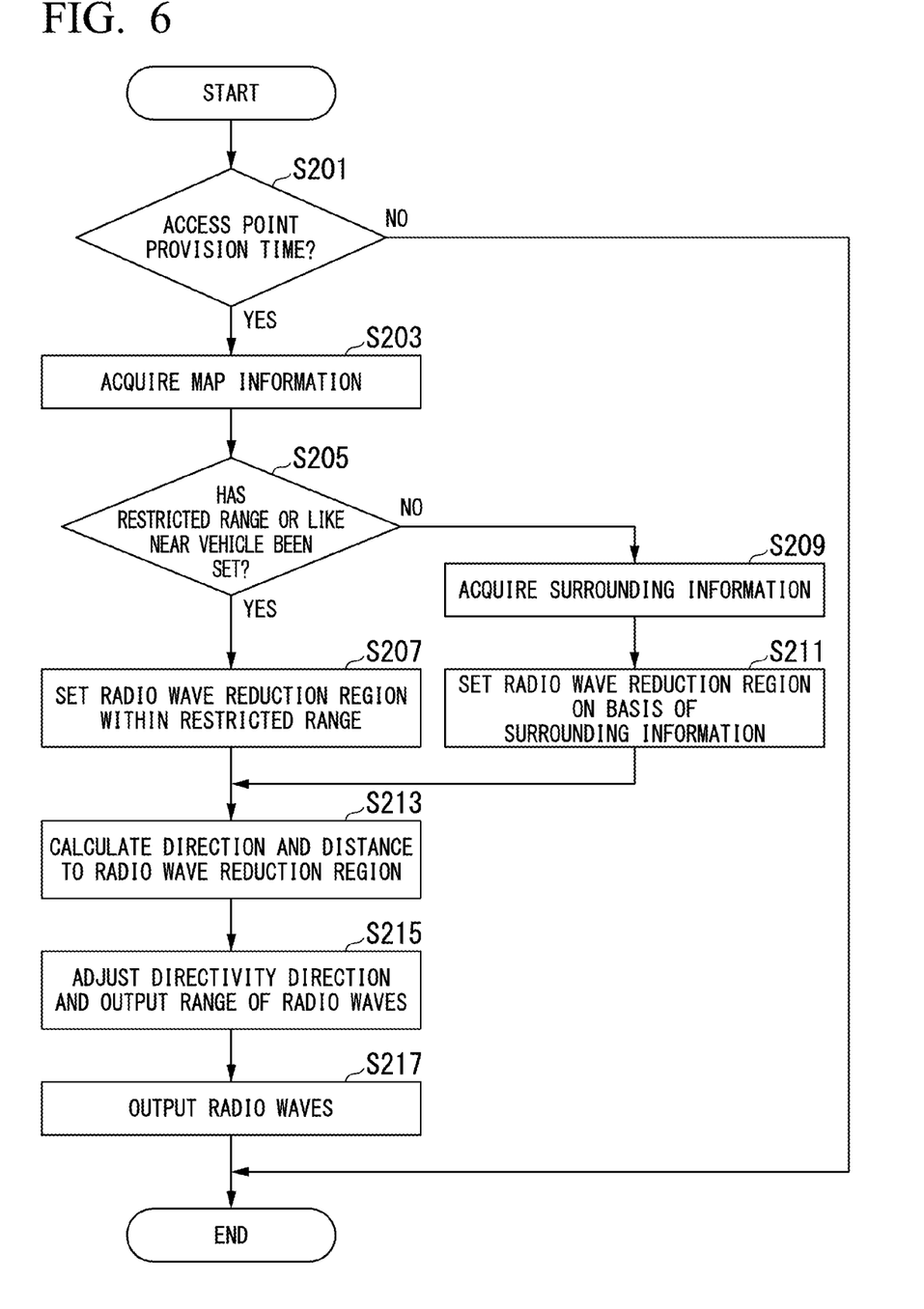
FIG. 6 is a flowchart showing an example of a process executed by a vehicle.

Next, a process of the vehicle 10 will be described. FIG. 6 is a flowchart showing an example of the process executed by the vehicle 10. The vehicle 10 determines whether or not it is an access point provision time (step S201). When it is not an access point provision time, the vehicle 10 ends the process shown in FIG. 6 as it is.

When it is an access point provision time, the vehicle 10 requests the management server 300 to provide the map information of the surroundings of the vehicle 10 detected by the position sensor 18 and acquires the map information transmitted by the management server 300 (step S203). Subsequently, the setting unit 54 determines whether or not a restricted range or the like has been set near the vehicle 10 (step S205). When a restricted range or the like has been set near the vehicle 10, the second setting unit 56 sets a radio wave reduction region within the restricted range included in the map information (step S207).

When a restricted range or the like has not been set near the vehicle 10, the first acquisition unit 51 acquires surrounding information about the surrounding environment of the antenna 80 on the basis of the image information generated by the in-vehicle camera 14 (step S209). For example, the first acquisition unit 51 acquires information of a positional relationship (a direction and a distance) of the vehicle 10 with a roadway, a sidewalk, a building, and the like included in the image information.

Subsequently, the first setting unit 55 sets a radio wave reduction region near the vehicle 10 on the basis of the surrounding information acquired by the first acquisition unit 51 (step S211). When the radio wave reduction region is set, the first setting unit 55 sets, for example, a range of a roadway and a range near an entrance of a building on a sidewalk included in the image information as the restricted range. The first setting unit 55 sets a range defined as the restricted range as the radio wave reduction region.

Subsequently, the control unit 58 calculates a direction of the radio wave reduction region as viewed from the vehicle 10 and a distance from the vehicle 10 to the radio wave reduction region with reference to the radio wave reduction region set by the setting unit 54 (step S213). When a plurality of radio wave reduction regions have been set, the control unit 58 calculates the direction of the radio wave reduction region as viewed from the vehicle 10 and the distance from the vehicle 10 to the radio wave reduction region with respect to all the radio wave reduction regions. Subsequently, the control unit 58 adjusts a directivity direction and an output range of radio waves transmitted by the antenna 80 so that the radio waves are transmitted to the normal region while avoiding the radio wave reduction region (step S215).

Figure 7:
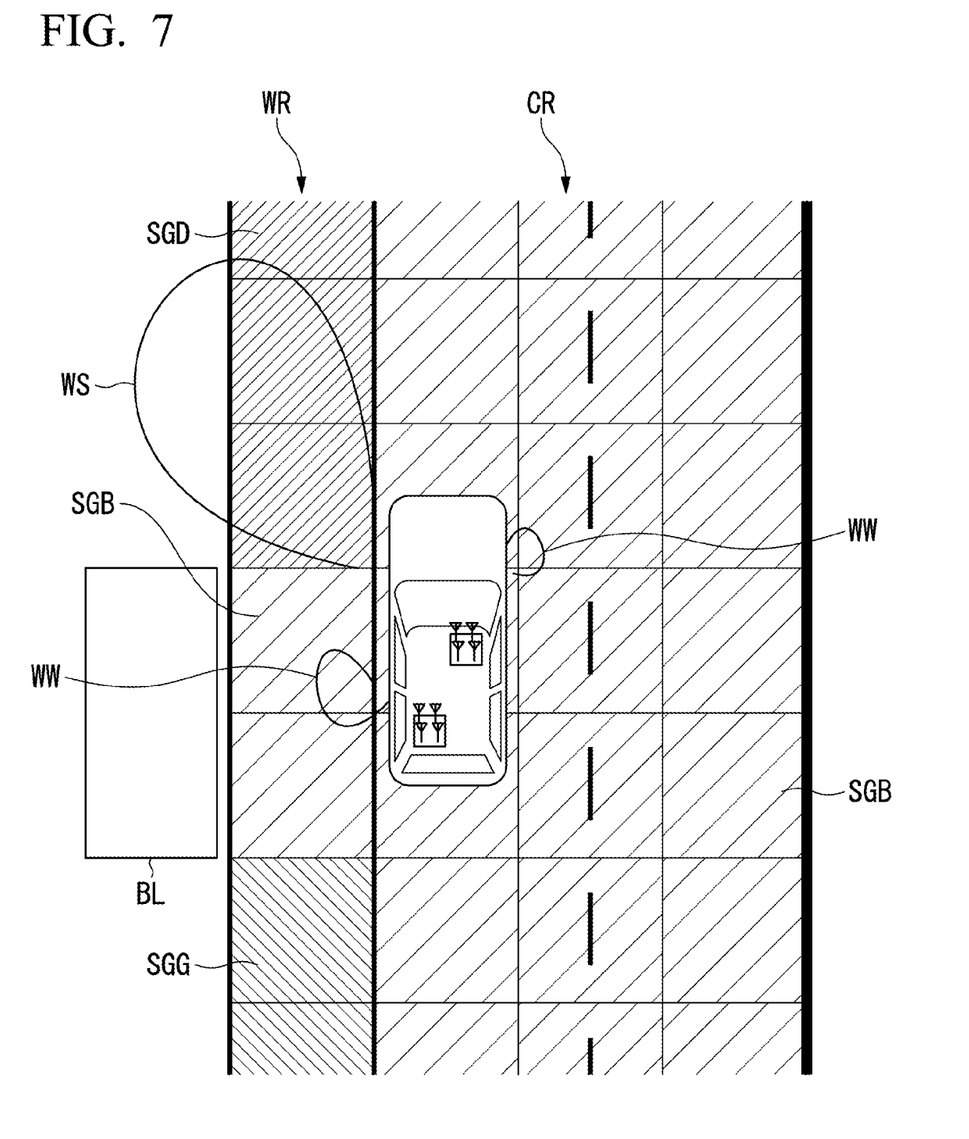
FIG. 7 is a diagram showing an example of a directivity direction of radio waves transmitted by the antenna.

For example, the second setting unit 56 in the setting unit 54 designates a non-restricted segment SGG near the vehicle 10 as the radio wave providing segment among non-restricted segments SGG shown in FIG. 2 included in the map information. The example shown in FIG. 7 is an example in which the second setting unit 56 designates a non-restricted segment SGG (FIG. 2) on a traveling direction side of the vehicle 10 with respect to the building BL on the sidewalk WR as a radio wave providing segment SGD.

The second setting unit 56 may use any standard for designating the radio wave providing segment SGD from the non-restricted region. For example, the second setting unit 56 sets the most well-organized non-restricted segment (a group of non-restricted segments having the largest area) in the range in which radio waves can be transmitted from the antenna 80 among the non-restricted segments as the radio wave providing segment SGD. Alternatively, the second setting unit 56 may designate the most well-organized non-restricted segment including the non-restricted segment closest to the vehicle 10 among the non-restricted segments as the radio wave providing segment SGD.

For example, the first setting unit 55 sets a well-organized region where the vicinity of the roadway and the entrance of the building has been avoided among regions included in the image information. The first setting unit 55 designates a designated region for setting as a normal region. For example, the first setting unit 55 designates a region having the largest area as the designated region among the well-organized regions where the vicinity of the roadway and the entrance of the building has been avoided. Alternatively, the first setting unit 55 may designate the region closest to the vehicle 10 as the designated region among the regions where the vicinity of the roadway and the entrance of the building has been avoided.

The setting unit 54 sets a region occupied by the designated region designated by the first setting unit 55 or the radio wave providing segment SGD designated by the second setting unit as the normal region and sets a region other than the normal region as the radio wave reduction region. As shown in FIG. 7, the control unit 58 controls the directivity direction of the radio waves transmitted by the antenna 80 so that the radio wave intensity of radio waves WS transmitted to the radio wave reduction region is less than the radio wave intensity of radio waves WW transmitted to the normal region. Subsequently, the control unit 58 outputs radio waves whose directivity direction and output range are adjusted using the antenna 80 (step S217). Subsequently, the vehicle 10 ends the process shown in FIG. 6.

Figure 8:
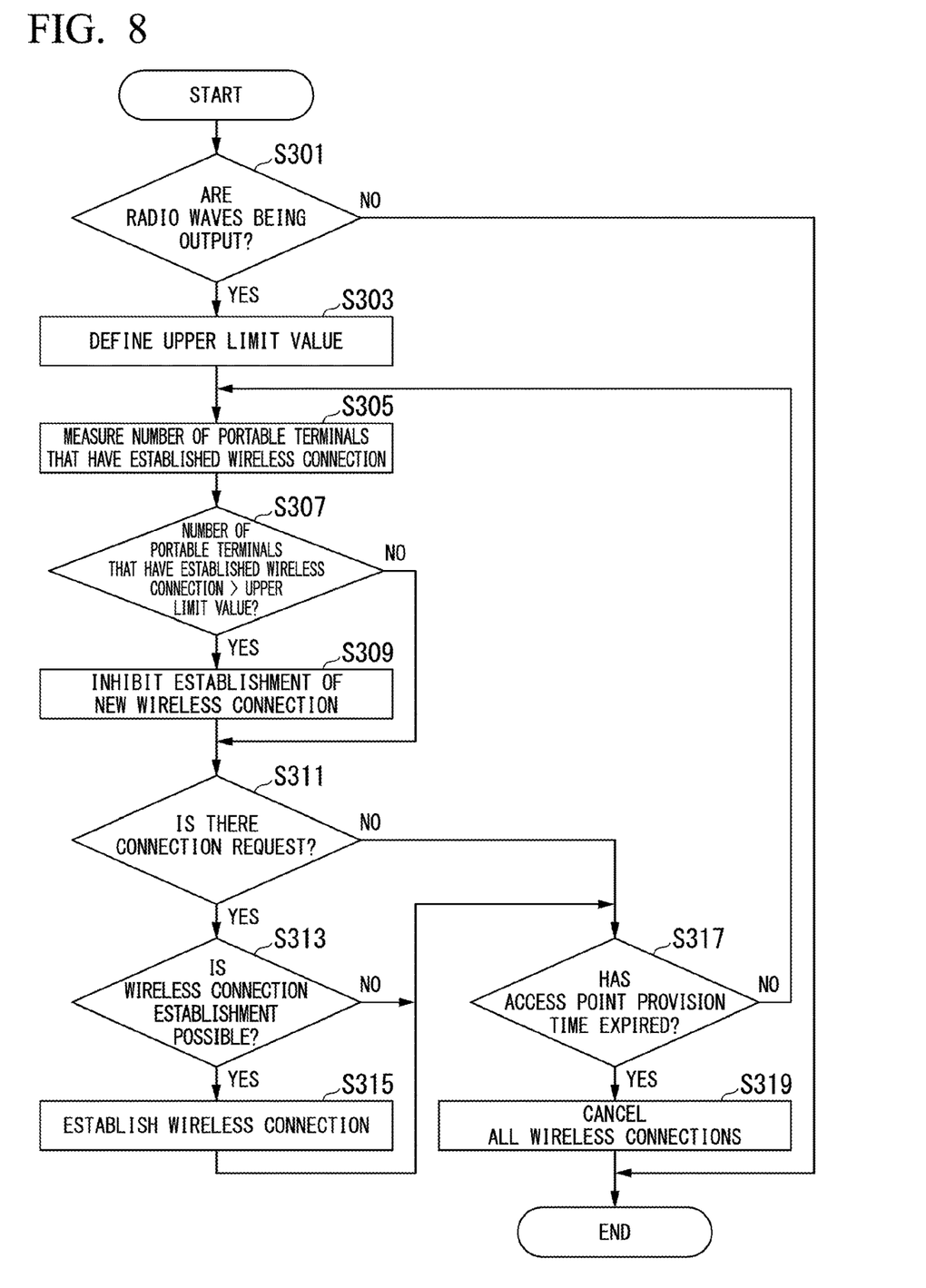
FIG. 8 is a flowchart showing an example of a process executed by the vehicle.

Subsequently, a procedure when the vehicle 10 performs mediation between the radio base station 100 and the portable terminal 200 will be described. FIG. 8 is a flowchart showing an example of a process executed by the vehicle 10. The definition unit 64 of the vehicle 10 determines whether or not the control unit 58 is outputting radio waves using the antenna 80 (step S301). When it is determined that the control unit 58 is not outputting radio waves using the antenna 80, the vehicle 10 ends the process shown in FIG. 8. When it is determined that the control unit 58 is outputting radio waves using the antenna 80, the definition unit 64 defines an upper limit value for use in the connection inhibition unit 62 on the basis of characteristics of the radio wave reduction region (step S303).

For example, when the normal region where the control unit 58 outputs radio waves using the antenna 80 is a region where people easily gather, for example, an event venue or the like, the upper limit value is set to be small so that confusion is avoided. When the normal region is a place that can accommodate many people, such as a plaza, the upper limit value is set to be large. When a radio wave intensity of the vehicle 10 associated with the radio base station 100 is weak and the number of circuits that can be connected is limited to a small number, the upper limit value is set to be small. When the radio wave intensity of the vehicle 10 associated with the radio base station 100 is strong and a communication rate can be maintained at a high level even if many circuits are connected, the upper limit value is set to be large. The upper limit value may be changed at any time during the radio wave output process due to a change in the radio wave intensity of the vehicle 10 associated with the radio base station 100 during the radio wave output process, a change in time, or the like.

Subsequently, the counting unit 60 measures the number of portable terminals 200 that have established a wireless connection with the access point function unit 30 (step S305). Subsequently, the connection inhibition unit 62 determines whether or not the number of portable terminals 200 that have established a wireless connection with the access point function unit 30 exceeds the upper limit value defined by the definition unit 64 (step S307).

When it is determined that the number of portable terminals 200 that have established a wireless connection with the access point function unit 30 exceeds the upper limit value defined by the definition unit 64, the connection inhibition unit 62 inhibits the establishment of a new wireless connection with the portable terminal 200 that has not established the wireless connection with the access point function unit 30 (step S309). When the definition unit 64 determines that the number of portable terminals 200 that have established a wireless connection with the access point function unit 30 does not exceed the defined upper limit value in step S307 or after step S309, the access point function unit 30 determines whether or not there is a connection request from the portable terminal 200 (step S311).

The access point function unit 30 determines whether or not a new wireless connection can be established with the access point function unit 30 when there is a connection request from the portable terminal 200 (step S313). For example, when the establishment of a new wireless connection has been inhibited in step S309, the access point function unit 30 determines that the new wireless connection cannot be established. For example, when a result of the authentication of the portable terminal 200 indicates that it is determined that the user does not have the right to use the access point function unit 30 of the vehicle 10, the access point function unit 30 determines that a new wireless connection cannot be established.

When it is determined that a new wireless connection can be established, the access point function unit 30 establishes a wireless connection with the portable terminal 200 that has transmitted the connection request (step S315). When the access point function unit 30 determines that there is no connection request from the portable terminal 200 in step S311 or when the access point function unit 30 determines that a new wireless connection cannot be established in step S313, the access point function unit 30 proceeds to step S317 as it is.

Subsequently, the access point function unit 30 determines whether or not the access point provision time has expired (step S319). When the access point function unit 30 determines that the access point provision time has not expired, the process returns to step S305 and the counting unit 60 counts the number of portable terminals 200 that have established a wireless connection with the access point function unit 30 (step S305).

When it is determined that the access point provision time has expired, the access point function unit 30 cancels wireless connections with all the portable terminals 200 that have established the wireless connections (step S319). Subsequently, the vehicle 10 ends the process of the flowchart shown in FIG. 8.

In the vehicle system 1 and the vehicle 10 of the embodiment, the control unit 58 controls the directivity direction of radio waves transmitted by the antenna 80 so that the radio wave intensity of radio waves transmitted to the radio wave reduction region is less than the radio wave intensity of radio waves transmitted to the normal region. The radio wave reduction region is set, for example, in a roadway region or a building entrance region where users are unlikely to be present on the basis of the surrounding environment of the antenna. Thus, the radio waves can be transmitted in the direction in which the user is present.

The radio wave reduction region is set on the basis of information of an image captured by the in-vehicle camera 14. Thus, it is possible to accurately set the roadway region or the building entrance region where the user is unlikely to be present near the vehicle 10. Alternatively, the radio wave reduction region is set on the basis of the restricted range and the non-restricted range included in the map information. Thus, a region in which the user is unlikely to be present can be set as a radio wave reduction region.

Beamforming using two or more antenna elements 81 is used to adjust the directivity of the radio waves transmitted from the antenna 80. Thus, the directivity of the radio waves transmitted from the antenna 80 can be adjusted with high accuracy. The radio wave reduction region is set in the roadway region set on the roadway or the entrance region set near the entrance of a building. Thus, it is possible to restrict the transmission of radio waves in a direction suitable for the absence of the user.

The vehicle 10 sets an upper limit value for the number of portable terminals 200 that establish a wireless connection with the access point function unit 30 and inhibits the establishment of a new wireless connection when the number of portable terminals 200 that have established a wireless connection with the access point function unit 30 exceeds the upper limit value. Thus, it is possible to inhibit the gathering of many users in a region where a wireless connection with the access point function unit 30 is possible. This upper limit is set on the basis of characteristics of the normal region. Thus, it is possible to inhibit the gathering of too many users with respect to the number of users that can be accommodated or the like.

Although the radio wave reduction region is set on the basis of the image information when the radio wave reduction region is set on the basis of the map information and the restricted range and the non-restricted range are set in the map information in the above-described embodiment, other forms may be used. For example, radio wave reduction regions may be set on the basis of both the map information and the image information and the entire region including both the radio wave reduction regions may be set as the radio wave reduction region. A region where the radio wave reduction region obtained on the basis of the map information and the radio wave reduction region obtained on the basis of the image information overlap may be set as the radio wave reduction region.

The restricted region and the non-restricted region may be set as follows. For example, a certain range of the side surface of the entrance within a shop such as a restaurant may be a non-restricted region. In this case, for example, the present invention is effective when the user uses the access point function of the vehicle 10 when meeting in the shop or playing a game for a long time.

A restricted region may be set near the entrance of the shop and a non-restricted region may be connected from the roadway to the entrance of the shop along the sidewalk with respect to a part of the vicinity of the entrance of the shop. In this case, the access point function of the vehicle 10 can be used between the roadway and the shop. The owner of the shop or the like may arbitrarily set a restricted region or a non-restricted region within the site of the shop.

A region where shop signboards and built-in advertisements can be viewed may be a non-restricted region. In this case, the shop owner may be able to set a non-restricted region. The non-restricted region may be a place where people are unlikely to annoy other people even if they are gathered and the restricted region may be a place where people are likely to be annoyed by other people. In this case, an administrator of the region and the like may be able to set the non-restricted region or the restricted region. For example, the restricted region may be set before a ticket gate of a station and the restricted region may be located near a cash register of the shop in the vicinity of the outdoor shop.

Surrounding information about a surrounding environment of the antenna 80 acquired by the first acquisition unit 51 may be information other than image information of an image captured by the in-vehicle camera 14. For example, the surrounding information may be information about environments such as a physical object near the antenna 80, a temperature, and a sound detected by various types of sensors such as a physical object recognition sensor, a temperature sensor, and a sound sensor. The various types of sensors may be provided in the vehicle 10 or may be provided in a place other than the vehicle 10. Although the rewriting unit 320 of the vehicle system 1 and the server storage unit 340 storing map information are provided in the management server 300 in the above-described embodiment, the rewriting unit or the storage unit storing map information are provided in the vehicle 10.

Although modes for carrying out the present invention have been described using embodiments, the present invention is not limited to the embodiments and various modifications and substitutions can also be made without departing from the scope and spirit of the present invention.

What is claimed is:

1. A vehicle which is movable, the vehicle comprising a processor configured to function as:
   an access point function unit which has an antenna and functions as an access point by wirelessly communicating with a terminal device located near the antenna; and
   a control unit which controls a directivity direction of radio waves transmitted through the antenna so that a radio wave intensity of radio waves transmitted to a first region set on the basis of a surrounding environment of the antenna is less than a radio wave intensity of radio waves transmitted to a second region other than the first region,
   the vehicle further comprising an in-vehicle camera,
   wherein the processor is configured to further function as:
   a first acquisition unit which acquires surrounding information about the surrounding environment of the antenna on a basis of an image information output by the in-vehicle camera; and
   a first setting unit which sets the first region on the basis of the surrounding information acquired by the first acquisition unit.

2. The vehicle according to claim 1, wherein the processor is configured to further function as:
   a second acquisition unit which acquires map information of a region where the vehicle moves; and
   a second setting unit which sets the first region on the basis of the map information acquired by the second acquisition unit.

3. The vehicle according to claim 1,
   wherein the antenna includes a plurality of antenna elements and
   wherein the control unit controls the directivity direction of the radio waves through beamforming using two or more antenna elements among the plurality of antenna elements.

4. The vehicle according to claim 1, wherein the first region includes at least one of a roadway region set in a roadway and an entrance region set near an entrance of a building.

5. The vehicle according to claim 1, wherein the processor is configured to further function as:
- a counting unit which measures the number of terminal devices that have established a wireless connection with the access point function unit; and
- a connection inhibition unit which inhibits a new wireless connection with the access point function unit and the terminal device from being established when the number of terminal devices measured by the counting unit exceeds a predetermined upper limit value.

6. The vehicle according to claim 5, wherein the processor is configured to further function as a definition unit which defines the upper limit value on the basis of characteristics of the second region.

7. A vehicle system comprising:
- a vehicle configured to be movable; and
- a processor configured to function as a management unit which manages the vehicle,
- wherein the processor of the vehicle system is configured to further function as a storage unit which stores a restricted range where wireless transmission by the vehicle is restricted as compared with another range, and
- wherein the vehicle includes a processor configured to function as:
- a detection unit which detects a position of the vehicle;
- an access point function unit which has an antenna and functions as an access point by wirelessly communicating with a terminal device located near the antenna;
- a setting unit which sets a first region for restricting a region where radio waves are transmitted through the antenna on the basis of the position of the vehicle detected by the detection unit and the restricted range stored in the storage unit; and
- a control unit which controls a directivity direction of radio waves transmitted through the antenna so that a radio wave intensity of radio waves transmitted to the first region set by the setting unit is less than a radio wave intensity of radio waves transmitted to a second region other than the first region.

8. The vehicle system according to claim 7,
- wherein the antenna includes a plurality of antenna elements and
- wherein the control unit performs beamforming using two or more antenna elements among the plurality of antenna elements and controls the directivity direction of the radio waves.

9. The vehicle system according to claim 7, wherein the first region includes at least a part of a roadway region set in a roadway and an entrance region set near an entrance of a building.

10. The vehicle system according to claim 7, wherein the processor of the vehicle system is configured to further function as a rewriting unit which rewrites the restricted range stored in the storage unit.

11. The vehicle system according to claim 7, wherein the processor of the vehicle is configured to further function as:
- a counting unit which measures the number of terminal devices that have established a wireless connection with the access point function unit; and
- a connection inhibition unit which inhibits a new wireless connection with the access point function unit and the terminal device from being established when the number of terminal devices measured by the counting unit exceeds a predetermined upper limit value.

12. The vehicle system according to claim 11, wherein the processor of the vehicle is configured to further function as a definition unit which define the upper limit value on the basis of characteristics of the second region.

* * * * *